Oct. 20, 1942.   J. H. MOSEL   2,299,702
PORTABLE HOPPER
Filed April 1, 1941   2 Sheets-Sheet 1

INVENTOR.
Joseph H. Mosel.
BY
*Corbett, Mahoney & Miller*
ATTORNEYS.

Oct. 20, 1942. J. H. MOSEL 2,299,702
PORTABLE HOPPER
Filed April 1, 1941 2 Sheets-Sheet 2

INVENTOR.
Joseph H. Mosel.
BY
Corbett, Mahoney & Miller
ATTORNEYS.

Patented Oct. 20, 1942

2,299,702

UNITED STATES PATENT OFFICE 2,299,702

PORTABLE HOPPER

Joseph H. Mosel, Columbus, Ohio, assignor to The Jaeger Machine Company, Columbus, Ohio, a corporation of Ohio Application April 1, 1941, Serial No. 386,368

3 Claims. (Cl. 189—3)

My invention relates to a portable hopper. It has to do, more particularly, with a hopper which may be readily moved from place to place and which is adapted to receive concrete from a truck mixer or the like and feed it into carts, wheelbarrows, et cetera.

One of the objects of my invention is to provide a portable hopper which is of such a nature that it not only can be readily transported from place to place but also can be readily, quickly and sturdily set up for operation.

Another object of my invention is to provide a portable hopper of the type indicated which is provided with means for permitting simultaneous discharge of the contents of the hopper into several carts or other receivers.

Another object of my invention is to provide a hopper of the type indicated which is of such a nature that when the material is discharged therein it will be fed equally in all directions therein and will not tend to segregate.

Another object of my invention is to provide a hopper of the type indicated which is of such a nature that the truck mixer may back up to the hopper and discharge its contents from substantially any angle.

Another object of my invention is to provide a hopper of the type indicated which is suitable for use either with a low discharge type truck mixer or a high discharge type truck mixer.

In its preferred form, my invention contemplates the provision of a hopper which is mounted on wheels for transportation but which has legs associated with the wheels that are of the telescoping type and which may be adjusted to support the hopper when it is brought to the desired location. The hopper is preferably divided into two compartments, each having a discharge gate on the bottom thereof to permit simultaneous discharge of the material into two carts, if desired. One side of the hopper is preferably provided with a bay at the top thereof into which the truck mixer is adapted to discharge its material from substantially any angle. This bay is so associated with the partition dividing the two compartments of the hopper that the material will be fed substantially equally into the two compartments without segregation. Furthermore, the bay has a flash board associated therewith which may be readily removed to adapt the hopper to low discharge mixers or may be readily replaced to adapt the hopper to high discharge mixers.

The preferred embodiment of my invention is illustrated in the accompanying drawings wherein similar characters of reference designate corresponding parts and wherein.

Figure 1:
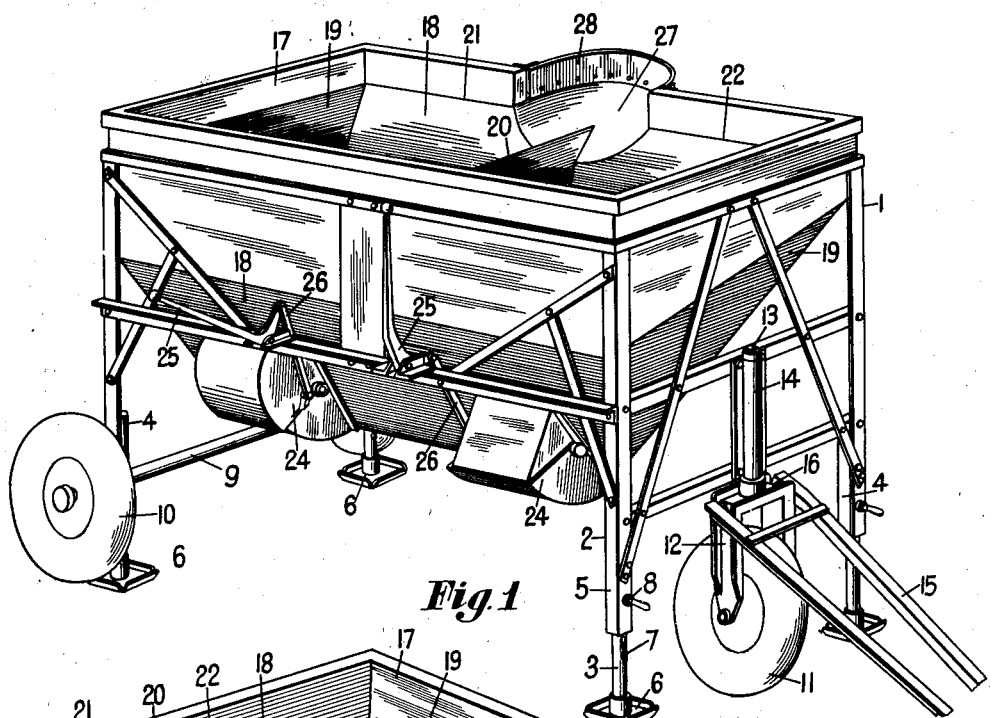
Figure 1 is a perspective view of a hopper made according to my invention and set up for use.
Figure 2:
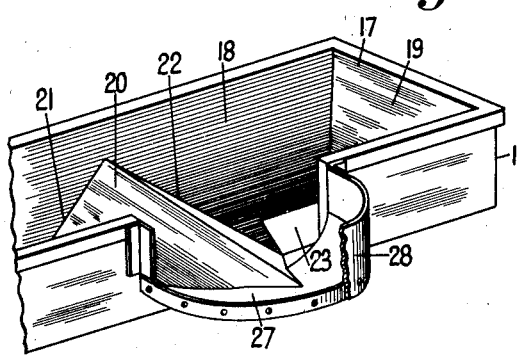
Figure 2 is a perspective view, partly broken away, showing the bay and the associated partition which divides the two compartments of the hopper.
Figure 3:
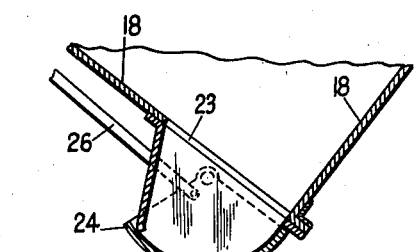
Figure 3 is a detail in vertical section illustrating one of the discharge gates of the hopper.
Figure 4:
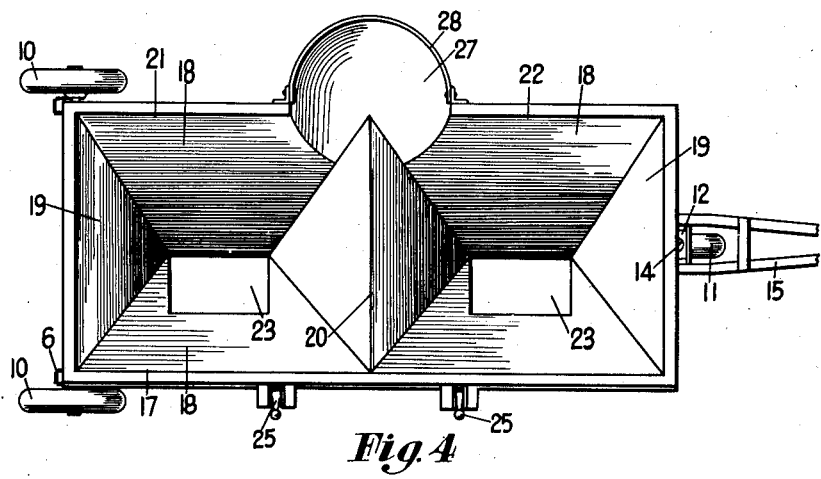
Figure 4 is a plan view of the hopper.
Figure 5:
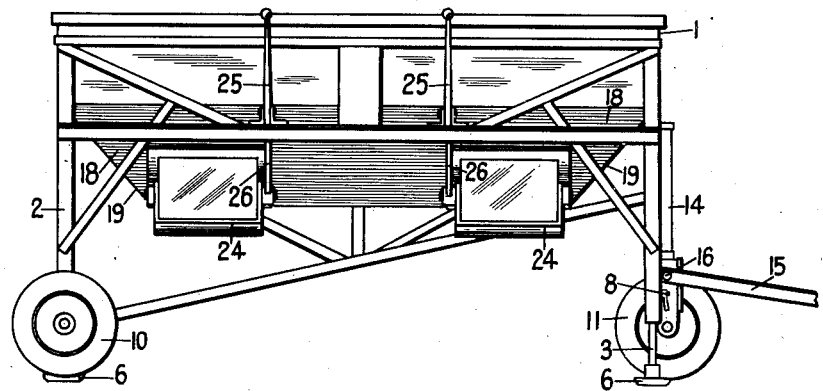
Figure 5 is an elevation of the side of the hopper opposite to where the bay is formed.
Figure 6:
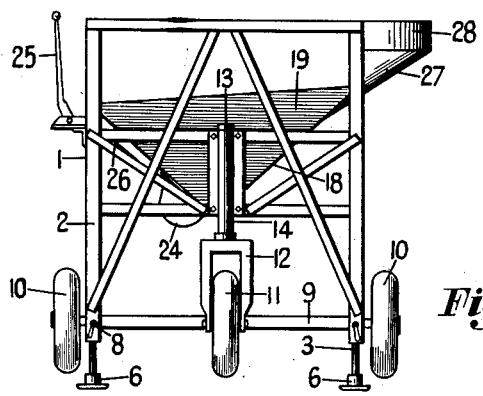
Figure 6 is an end view of the hopper.

With reference to the drawings, I have illustrated my portable hopper as comprising a frame 1 which is suitably fabricated from steel angle irons or similar members. The frame is provided with four legs 2 of the telescoping type. Each leg structure 2 comprises a pipe 3 which slidably fits within a sleeve 4 secured to the lower end of the angle iron 5 forming a part of the leg structure. The pipe 3 carries a flat shoe 6 on its lower end. The pipe is provided with a series of vertically spaced openings 7 which are adapted to receive the inner end of a pin 8. The inner end of the pin 8 passes through an opening formed in angle member 5 and sleeve 4. Thus it will be apparent that the pipe 3 may be adjusted in and out of the sleeve 4 and may be held in any adjusted position.

The rear portion of the frame 1 carries an axle 9 on which wheels 10 are mounted which preferably carry pneumatic tires. The front of the frame 1 carries a single wheel 11 of the same type by means of which the unit may be steered. The wheel 11 is supported on a yoke 12 which has an upstanding pin or shaft 13 that is rotatably mounted in a sleeve 14 secured to the front of the frame. A tongue member 15 is pivotally attached, as at 16, to the yoke 12 for vertical movement. It will be apparent that when it is desired to transport the unit from one location to another, the pipes 3 are moved vertically until the shoes 6 are out of contact with the ground. Then the unit may be pulled along on the wheels by means of the tongue 15. When the unit reaches the desired location, the telescoping legs may be adjusted until the weight of the hopper is supported by the shoes 6 rather than the wheels.

The hopper itself comprises an elongated container 17 having an open top. This container 17 has side walls 18 which converge towards their lower edges and end walls 19 which also converge towards their lower edges. Intermediate its ends, the container 17 is provided with a transversely extending inverted V-shaped partition 20. This partition 20 serves to divide the container 17 into two separate compartments 21 and 22. Each compartment 21 and 22 is provided with a discharge opening 23 in the bottom thereof. Each opening 23 is controlled by a pivoted gate 24. The gate 24 may be operated by means of a bell crank lever 25 pivoted to the frame 1. This lever 25 is connected by a pivoted link 26 to the gate 24. Thus, it will be apparent that either gate may be operated independently of the other so that material may be discharged from either of the compartments into a cart or other container moved beneath the hopper.

The upper edge of the partition 20 terminates at a point spaced below the upper edge of the container 17. At the rear side of the container 17 at the upper end thereof and midway between the ends thereof a bay 27 is formed. The upper portion of the partition 20 extends into this bay and serves to equally divide the lower portion thereof. The bay 27 curves outwardly and slopes downwardly in all directions. The top edge of the wall of the bay 27 is provided with a removable flash board 28. Because of the bay 27, a truck mixer may back up to the hopper and discharge its material from any angle. If the mixer is of a high discharge type, the flash board 28 will be kept in place and will, consequently, increase the capacity of the hopper. On the other hand, if the truck mixer is of the low discharge type, the flash board 28 is removed to permit discharge of the material therefrom into the hopper. The material will be discharged into the bay 27 and will be divided by the partition 20 and will consequently, flow in both directions into the compartments 21 and 22 without segregation.

It will be apparent from the above description that I have provided a portable hopper having many advantages. Most of these advantages have been discussed and others will be apparent.

Having thus described my invention, what I claim is:

1. A hopper unit of the type described comprising a container, a partition dividing the container into separate compartments, a material receiving bulge formed in one wall of said container, said partition extending into said bulge and being of such a nature that it will direct the material into both of said compartments.

2. A hopper unit of the type described comprising a container, an inverted V-shaped partition dividing the container into separate compartments, a material receiving bay formed in one wall of said container, said partition being spaced from the upper edge of said container and extending into said bay so that it will direct material discharged in said bay in both directions into said compartments.

3. A hopper unit according to claim 2 wherein the bay is curved so that trucks may discharge material thereinto from various angles and wherein the bay is provided with a removable flash board to vary the height of the wall thereof.

JOSEPH H. MOSEL.